United States Patent
Parker et al.

(10) Patent No.: US 6,809,657 B1
(45) Date of Patent: Oct. 26, 2004

(54) COURSE DEVIATION INDICATOR WITH UNIQUE DISPLAY

(75) Inventors: Craig B. Parker, Olathe, KS (US); Walter Rolston, Overland Park, KS (US)

(73) Assignee: Garmin Corporation (TW)

( * ) Notice: Subject to any disclaimer, the term of this patent is extended or adjusted under 35 U.S.C. 154(b) by 430 days.

(21) Appl. No.: 09/549,118

(22) Filed: Apr. 13, 2000

(51) Int. Cl.$^7$ .................. G01C 21/00; G01C 23/00
(52) U.S. Cl. .................................. 340/945; 340/971
(58) Field of Search ........................ 340/945, 971, 340/976, 979

(56) References Cited

U.S. PATENT DOCUMENTS

| | | | | |
|---|---|---|---|---|
| 3,887,872 A | * | 6/1975 | Sharpe | 325/21 |
| 4,069,412 A | * | 1/1978 | Foster et al. | 364/448 |
| 4,415,879 A | * | 11/1983 | Brady et al. | 340/976 |
| 4,811,679 A | * | 3/1989 | Masuzawa et al. | 114/144 RE |
| 5,610,600 A | * | 3/1997 | Koenig | 340/976 |

* cited by examiner

*Primary Examiner*—John Tweel
(74) *Attorney, Agent, or Firm*—Devon A. Rolf

(57) ABSTRACT

A course deviation indicator with a unique display utilizes at least one deviation bar, to indicate when a craft or vessel in which the course deviation indicator is utilized has deviated from a pre-established course. In one embodiment, the course deviation indicator has a lateral deviation bar, for indicating lateral deviation from a pre-established course, and a vertical deviation bar, for indicating vertical deviation from a pre-established course. A first, vertical, flag is associated with the vertical deviation bar, while a second, lateral flag is associated with the lateral deviation bar. When a determination is made that a particular deviation bar is providing inaccurate information, the appropriate flag is displayed, thereby indicating that the associated deviation bar is indeed providing inaccurate information. In one embodiment, the flags are displayed mechanically. In a second embodiment, the display is an LCD display, and flags are displayed by drawing the flags on the LCD display. Particularly, each flag is presented in the form of a bi-directional arrow. The vertical flag is oriented vertically on the display at a location proximate the outer end of the vertical deviation bar when the vertical deviation bar is in a centered position, and the lateral flag is presented laterally with respect to the display, and located proximate an outer end of the lateral deviation bar when the lateral deviation bar is in the centered position. The utilization of arrows as the flags, with no other identifying information, makes it particularly easy for a pilot or navigator of the craft or vessel in which the present invention is utilized to ascertain the nature of a deviation from a pre-established course.

26 Claims, 2 Drawing Sheets

COURSE DEVIATION INDICATOR WITH UNIQUE DISPLAY

BACKGROUND OF THE INVENTION

1. Field of the Invention

The present invention is directed to an aircraft course deviation indicator. More particularly, the present invention is directed to an aircraft course deviation indicator having improved flags for indicating when the course deviation indicator is providing a reading that is known to be in error.

2. Description of the Related Art

Aircraft course deviation indicators are well known. A course deviation indicator provides a display for indicating to a pilot or navigator of an aircraft any deviation between the actual flight path of the aircraft and a pre-established course. Conventional course deviation indicators utilize a vertical deviation bar which moves upwardly or downwardly from a center position as the aircraft correspondingly deviates from the desired course. Additionally, the course deviation indicator utilizes a lateral deviation bar which moves laterally as the aircraft correspondingly deviates from a desired lateral course. Inputs to the course deviation indicator traditionally come from a glide slope and VHF NAV unit, but are increasingly being provided from a GPS unit.

Additionally, many traditional course deviation indicators utilize a pair of flags to indicate to the pilot or navigator that the course deviation indicator is not providing valid or accurate data. In this regard, FIG. 1, described in greater detail below, illustrates a conventional prior art course deviation indicator. As illustrated, in the prior art design, a vertical flag is visually presented on a display of the course deviation indicator when a determination is made that the vertical deviation bar is providing inaccurate information and, thus, should be ignored. Similarly, a lateral flag is visually displayed, in the prior art design, when a determination is made that the lateral deviation bar is providing inaccurate information, and should thus be ignored.

The present invention is an improvement over conventional prior art course deviation indicators. Particularly, the present invention provides a unique course deviation indicator for indicating to an aircraft pilot or navigator that a display of the course deviation indicator is not providing accurate information. More particularly, the present invention provides a course deviation indicator which more readily indicates to a pilot or navigator the nature of such an inaccuracy.

SUMMARY OF THE INVENTION

The present invention is a course deviation indicator having a display that utilizes a vertical deviation bar and a lateral deviation bar, each of which moves corresponding to a deviation in the actual path of an aircraft from an intended course. In accordance with an aspect of the invention, a first indicator, sometimes referred to herein as a vertical flag, is provided on the display at a location proximate an outer end of the vertical deviation bar when the vertical deviation bar is located at a center position. In particular, the first indicator (e.g., the vertical flag) is a bi-directional arrow oriented in a vertical orientation with respect to the display. Additionally, a second indicator, sometimes referred to herein as a lateral flag, is positioned on the display at a location proximate an outer end of the lateral deviation bar when the lateral deviation bar is at a centered position. Like the vertical flag, the lateral flag is in the form of a bi-directional arrow. However, unlike the vertical flag, the lateral flag is presented in a lateral orientation with respect to the display. In a preferred embodiment, the coloration or color scheme of each of the vertical flag and lateral flag are such that each is colored differently than the remainder of the display in such a way as to command immediate attention. Specifically, in one particularly preferred embodiment of the invention, each flag comprises a red arrow or, alternatively, a black arrow on a red background.

As will be understood, the vertical flag is displayed visually only when a determination is made that the vertical deviation bar is illustrating inaccurate information, such as is determined in a conventional manner. Similarly, the lateral flag is visually displayed only when a determination is made, in a conventional manner, that the lateral deviation bar is providing inaccurate information. The visual display of the unique flags is accomplished in a conventional manner, such as by mechanical positioning of the flag into a visible position or window within the display. Additionally, when a determination to display a flag is made and the appropriate, corresponding flag is displayed, the deviation bar with which the displayed flag is associated is automatically moved back to centered position.

Additionally, in an alternate embodiment of the present invention, only one deviation bar and associated flag are utilized. For example, the device of the present invention may utilize only a lateral deviation bar and associated flag. Such a device is particularly useful for marine navigation, in which altitude is not an issue. In an aircraft, such a device might be used for en-route navigation if no vertical course guidance is provided.

Additionally, in still yet another alternate embodiment of the invention, a display is an LCD display. In such an embodiment, a display controller draws the lateral flag and/or vertical flag directly on the LCD display, as needed.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
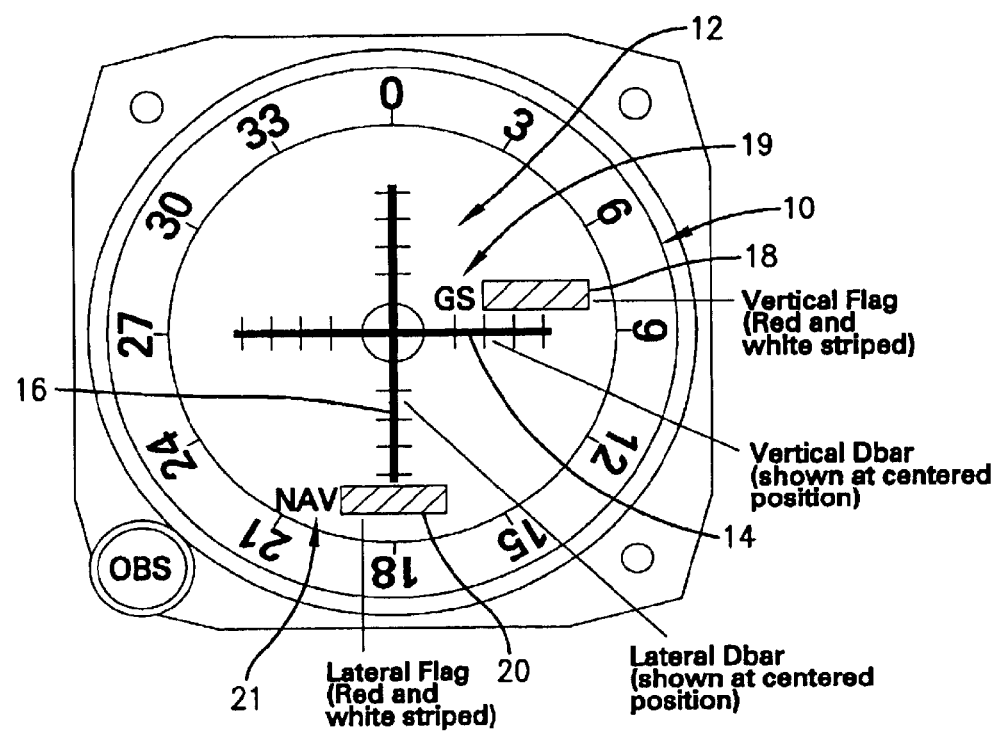
FIG. 1 illustrates one conventional prior art design of a course deviation indicator.

With reference initially to FIG. 1, a prior art course deviation indicator is denoted generally by reference numeral 10. Course deviation indicator 10 is of a type manufactured by Honeywell (formerly King Radio) under product number KI 209 CDI. Prior art course deviation indicator 10 has a display 12. Within display 12 is a vertical deviation bar (sometimes called a "D-bar"), denoted generally by reference numeral 14. Also within display 12 is a lateral deviation bar denoted generally by reference numeral 16. As will be understood and appreciated by those with skill in the art, when an aircraft in which the course deviation indicator 10 is utilized deviates from a predetermined course, one or both of the deviation bars 12, 14 moves correspondingly with the deviation of the aircraft from the predetermined course. In this regard, when, for example, an aircraft actually travels at an altitude that is higher than the predetermined course, the vertical D-bar 14 will migrate downward from its center position. Similarly, for example, when the aircraft deviates off course to the right of its intended course, the lateral D-bar will move from its centered position to the left, thereby correspondingly indicating the nature and extent of the off-course condition. As will be apparent and understood, when the aircraft deviates from its predetermined course in both a vertical and lateral direction, each of the vertical deviation bar and lateral deviation bar correspondingly move from its respective center position. The construction and use of course deviation indicators is well known in the art, and it will be readily understood that the navigation input or inputs to the course deviation indicator are obtained from a GPS unit and/or a glide slope and VHF NAV unit.

Additionally, and as will also be readily understood by those with skill in the art, conventional prior art course deviation indicators typically utilize a pair of flags to indicate when the course deviation indicator is representing inaccurate information. In particular, conventional course deviation indicators utilize a first, vertical flag 18 and a second, lateral flag 20. It is usual practice to identify the vertical flag with the label "GS" 19 indicating that the vertical deviation data from the glide slope unit is invalid. Similarly, it is usual practice to identify the lateral flag with the label "NAV" 21 indicating that the lateral deviation data from the VHF NAV unit is invalid. Traditionally, these flags are located within a window in display 12, and are mechanically positioned into or out of view within this window in a conventional manner. Specifically, when a determination is made electronically that the vertical deviation bar 14 of the course deviation indicator is providing inaccurate information, the vertical flag 18 is mechanically positioned into view, thereby visually displaying vertical flag 18 to indicate to the pilot or navigator of the aircraft that the vertical deviation bar 14 is in fact indicating inaccurate information. In such an instance, it is also conventional to mechanically move the vertical D-bar back to its center position and maintain the vertical flag 18 in a displayed condition until such time as a determination is made that the vertical deviation bar is again ready to indicate proper information. Similarly, the lateral flag 20 is mechanically positioned into view when a determination is made that the lateral deviation bar 16 is indicating improper information. Again, it is conventional in such a circumstance to return the lateral deviation bar to its center position and continue displaying the lateral flag 20 until such time as a determination is made that the lateral deviation bar is again ready to indicate accurate information. It will be understood and appreciated that these determinations of when to display a flag 18, 20 and when to again hide the flag are made by a controller (e.g., a processor) based upon information obtained from one or more navigation units, such as one or more GPS, glide slope, and/or VHF NAV units, etc.

Figure 2:
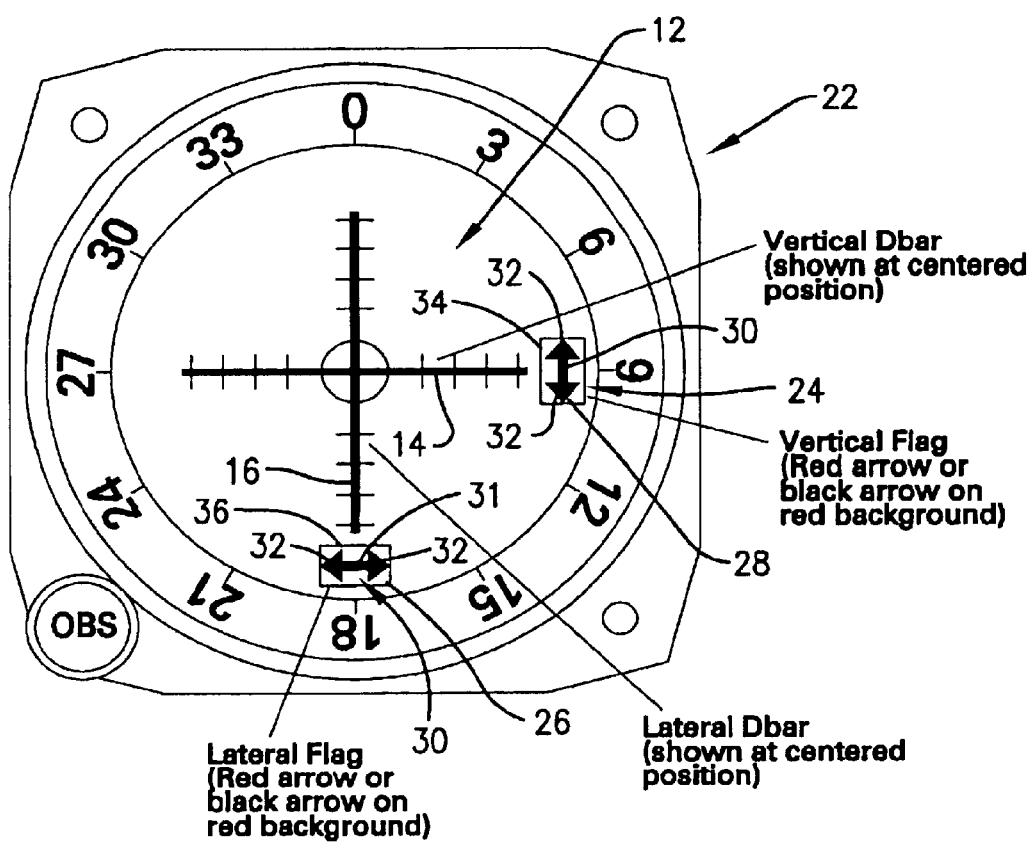
FIG. 2 illustrates a course deviation indicator of the present invention.

With reference now to FIG. 2, the course deviation indicator of the present invention is illustrated and described. In particular, reference numerals with respect to FIG. 2, which is illustrative of the present invention, are the same as those reference numerals utilized in conjunction with the prior art configuration of FIG. 1 where those elements of the present invention bear no difference from the prior art design illustrated in FIG. 1. In particular, the course deviation indicator, illustrated in FIG. 2 of the present invention, is denoted generally by reference numeral 22. Course deviation indicator 22 of the present invention has a display 12 having a vertical deviation bar 14 and a lateral deviation bar 16.

In contrast to the prior art configuration illustrated in FIG. 1, the course deviation indicator 22 of the present invention utilizes a first, vertical flag 24 that is entirely different in orientation and configuration than that of the corresponding vertical flag 18 conventionally found in the prior art. Additionally, course deviation indicator 22 of the present invention utilizes a lateral flag 26 also having a configuration that is different from that found in the prior art. In particular, vertical flag 24 of the present invention has an arrow 28 presented in a vertical orientation with respect to display 12. The arrow 28 is bi-directional in nature, and has a central portion 30 with arrow heads 32 positioned at opposite outer ends of the central portion 30. Similarly, lateral flag 26 has a bi-directional arrow 30 having a central portion 31 and outer ends 32 formed as arrow heads. In contrast to arrow 28 of vertical flag 24, however, arrow 30 of lateral flag 26 is oriented in a lateral direction with respect to display 12. Each flag 24, 26 is positioned proximate an outer end of its respective deviation bar 14, 16 when those deviation bars 14, 16 are presented at a central position. Because all of the desired information is conveyed by the unique design of the flag itself, no labels such as "GS" 19 and "NAV" 21 such as are typically utilized on the prior art configuration are required.

Additionally, in an alternate embodiment of the present invention, only one deviation bar and associated flag are utilized. For example, the device of the present invention may utilize only a lateral deviation bar and associated flag. Such a device is particularly useful for marine navigation, in which altitude is not an issue. In an aircraft, such a device might be used for en-route navigation if no vertical course guidance is provided.

Additionally, in still yet another alternate embodiment of the invention, a display is an LCD display. In such an embodiment, a display controller draws the lateral flag and/or vertical flag directly on the LCD display, as needed.

The overall function of course deviation indicator 22 of the present invention is the same as that of course deviation indicator 10 of the prior art. In other words, vertical flag 24 is visually displayed, such as by mechanically positioning the flag into view in display 12, when a determination is made that the vertical deviation bar 14 is presenting improper information, or would present improper information if allowed to move from its centered position. Similarly, lateral flag 26 is visually presented, such as by mechanically positioning the flag into view in display 12, when a determination is made that the lateral deviation bar 16 is presenting improper information, or would present improper information if allowed to depart from its centered position.

Thus, while the course deviation indicator 22 of the present invention is constructed and operates much like that of the course deviation indicator 10 of the prior art, the configuration, position and/or orientation of the flags 24, 26 utilized by the present invention, taken alone or in combination, provide a significant functional advantage to the pilot or navigator of an aircraft in which the course deviation indicator 22 is used, when compared with the prior art course deviation indicator 10. In this regard, since the flags 18, 20 of the prior art are identical in construction and orientation, visual presentation of only one of those flags 18, 20 on the display 12 requires the pilot or navigator of the aircraft in which the prior art course deviation indicator 10 is used to make an additional interpretation of which flag it is that is being displayed. In other words, the pilot or navigator must make a mental association of flag 18 with vertical deviation bar 14, and of flag 20 with lateral deviation bar 16. While this may be a simple matter when both flags are displayed, when only one of the flags 18, 20 is displayed, the pilot or navigator must view something more than just the flag, since each flag is identical. In particular, the pilot must make a visual and mental association with the displayed flag and its corresponding deviation bar based upon the usual "NAV" 19 and "GS" 21 labels located near these flags. This requires the pilot to mentally associate the in-view flag with the unit that has traditionally provided the deviation data to the deviation bar associated with that flag. Further, with the increasing use of GPS units to provide this same deviation data, the terms "NAV" and "GS" are no longer correct when the lateral and vertical deviation data is provided by the GPS unit. Use of these labels to identify the flags in this case, actually provides incorrect source identification data to the pilot. In complete contrast, the course deviation indicator 22 of the present invention prevents the pilot or navigator from having to make such an additional mental association, thus reducing the time and concentration required to determine that the aircraft in which the course deviation indicator 22 is utilized is off course.

For example, assuming that a vertical flag has been displayed, thus indicating that its associated vertical deviation bar is providing an improper reading, a view of the prior art course deviation indicator 10 would require the pilot to look beyond the in-view vertical flag 18, since that flag 18 is similar in construction and orientation to lateral flag 20. In other words, the pilot would have to look beyond the flag 18, and to make a visual and mental determination of the deviation bar with which the flag 18 is associated. In contrast, with the course deviation indicator of the present invention, the pilot or navigator can make an immediate determination, upon viewing vertical flag 24, that the vertical deviation bar 14 is presenting inaccurate information. In fact, this determination can be made without the pilot or navigator having to make an additional mental association between the in-view flag 24 and its corresponding deviation bar. This determination is made possible since the vertical deviation flag 24 is oriented in a direction that is different from that of the lateral deviation flag 26. While the present invention contemplates and encompasses a construction in which the flags 24, 26 of the present invention are merely rectangular, oblong, or some other elongate configuration, thereby readily permitting a pilot/navigator to ascertain the orientation of the flag relative to the display, the use of a bi-directional arrow is particularly advantageous since it does not require the pilot or navigator to discern the relative difference between the length and width of the flag. In other words, the bi-directional arrow provides the pilot or navigator with a symbol enabling him or her to immediately recognize the nature of a deviation of the aircraft from its intended course.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A course deviation indicator for use in indicating a deviation of an aircraft from a pre-established course, said course deviation indicator comprising:

a display having a vertical deviation bar and a lateral deviation bar, wherein a position of said vertical deviation bar is indicative of a deviation from said pre-established course in a vertical direction, and wherein a position of said lateral deviation bar is indicative of a deviation from said pre-established course in a lateral direction; and a first indicator positioned in association with said vertical deviation bar and a second indicator positioned in association with said lateral deviation bar, wherein each said indicator comprises an arrow.

2. The course deviation indicator as set forth in claim 1, wherein each said arrow is a bi-directional arrow.

3. The course deviation indicator as set forth in claim 1, wherein said first indicator is oriented in a vertical direction with respect to said display and said second indicator is oriented in a lateral direction with respect to said display.

4. The course deviation indicator as set forth in claim 3, wherein each said indicator is a bi-directional arrow.

5. The course deviation indicator as set forth in claim 4, wherein each bi-directional arrow comprises a visual coloration that is different than a remainder of said display.

6. The course deviation indicator as set forth in claim 5, wherein said first indicator is located proximate an outer end of said vertical deviation bar when said vertical deviation bar is in a center position, and wherein said second indicator is located proximate an outer end of said lateral deviation bar when said lateral deviation bar is in a center position.

7. The course deviation indicator as set forth in claim 6, wherein said first indicator is visually revealed only when a determination is made that said vertical deviation bar is displaying an improper reading, and wherein said second indicator is visually revealed only when a determination is made that said lateral deviation bar is displaying an improper reading.

8. The course deviation indicator as set forth in claim 1, wherein said first indicator is located proximate an outer end of said vertical deviation bar when said vertical deviation bar is in a center position, and wherein said second indicator is located proximate an outer end of said lateral deviation bar when said lateral deviation bar is in a center position.

9. The course deviation indicator as set forth in claim 1, wherein said first indicator is visually revealed only when a determination is made that said vertical deviation bar is displaying an improper reading, and wherein said second indicator is visually revealed only when a determination is made that said lateral deviation bar is displaying an improper reading.

10. The course deviation indicator as set forth in claim 9, wherein said first and said second indicators are placed within respective windows formed within a face of said display and are mechanically positioned into and out of view.

11. The course deviation indicator of claim 1, wherein said display is an LCD display.

12. A course deviation indicator for use in indicating a deviation of an aircraft from a pre-established course, said course deviation indicator comprising:

a display having a vertical deviation bar and a lateral deviation bar, wherein a position of said vertical deviation bar is indicative of a deviation from said pre-established course in a vertical direction, and wherein a position of said lateral deviation bar is indicative of a deviation from said pre-established course in a lateral direction;

a first indicator positioned in association with said vertical deviation bar and a second indicator positioned in association with said lateral deviation bar, wherein said first indicator is oriented in a vertical direction with respect to said display and is located proximate an outer end of said vertical deviation bar when said vertical deviation bar is in a center position on said display, and wherein said second indicator is oriented in a lateral direction with respect to said display and is located proximate an outer end of said lateral deviation bar when said lateral deviation bar is in a center position on said display; and the said first indicator is not associated with said vertical deviation bar through the identification of the source of the vertical deviation data, and wherein said second indicator is not associated with said lateral deviation bar through the identification of the source of the lateral deviation data.

13. The course deviation indicator as set forth in claim 12, wherein each said indicator is an arrow.

14. The course deviation indicator as set forth in claim 13, wherein each said arrow is a bi-directional arrow.

15. The course deviation indicator as set forth in claim 12, wherein each indicator comprises a visual coloration that is different than a remainder of said display.

16. The course deviation indicator as set forth in claim 12, wherein said first indicator is visually revealed only when a determination is made that said vertical display bar is displaying an improper reading, and wherein said second indicator is visually revealed only when a determination is made that said lateral display bar is displaying an improper reading.

17. The course deviation indicator as set forth in claim 16, wherein said first and said second indicators are placed within respective windows formed in a face of said display and are mechanically positioned into and out of view.

18. The course deviation indicator as set forth in claim 16, wherein said determinations are made based upon data received from a GPS receiver.

19. The course deviation indicator of claim 12, wherein said display is an LCD display.

20. In an aircraft course deviation indicator having a display, a vertical deviation bar with an associated vertical inaccuracy flag and a lateral deviation bar with an associated lateral inaccuracy flag, the improvement comprising:

said vertical inaccuracy flag being elongated in shape and oriented vertically with respect to said display and not identified by a label indicating the data source of the inaccuracy; and said lateral inaccuracy flag being elongated in shape and oriented laterally with respect to said display and not identified by a label indicating the data source of the inaccuracy.

21. The improvement of claim 20, wherein each said flag comprises an arrow.

22. The improvement of claim 20, wherein each said flag comprises a bi-directional arrow.

23. A course deviation indicator for use in indicating a deviation of a craft from a pre-established course, said course deviation indicator comprising:

a display;

a deviation bar, wherein a position of said deviation bar is indicative of a deviation from said pre-established course;

a flag displayable in association with said deviation bar, wherein a display of said flag indicates that said deviation bar is providing an improper reading, wherein said flag displays an arrow.

24. The course deviation indicator as set forth in claim 23, wherein said flag comprises a bi-directional arrow.

25. The course deviation indicator as set forth in claim 23, wherein said display is an LCD display.

26. A course deviation indicator for use in indicating a deviation of an aircraft from a pre-established course, said course deviation indicator comprising:

a display having a vertical deviation bar and a lateral deviation bar, wherein a position of said vertical deviation bar is indicative of a deviation from said pre-established course in a vertical direction, and wherein a position of said lateral deviation bar is indicative of a deviation from said pre-established course in a lateral direction; and a first indicator positioned in association with said vertical deviation bar, and a second indicator positioned in association with said lateral deviation bar, wherein said first indicator is oriented in a vertical direction with respect to said display, and said second indicator is oriented in a lateral direction with respect to said display.

* * * * *